C. W. STRAUSER.
TIRE.
APPLICATION FILED OCT. 20, 1919.
1,355,788.                                           Patented Oct. 12, 1920.
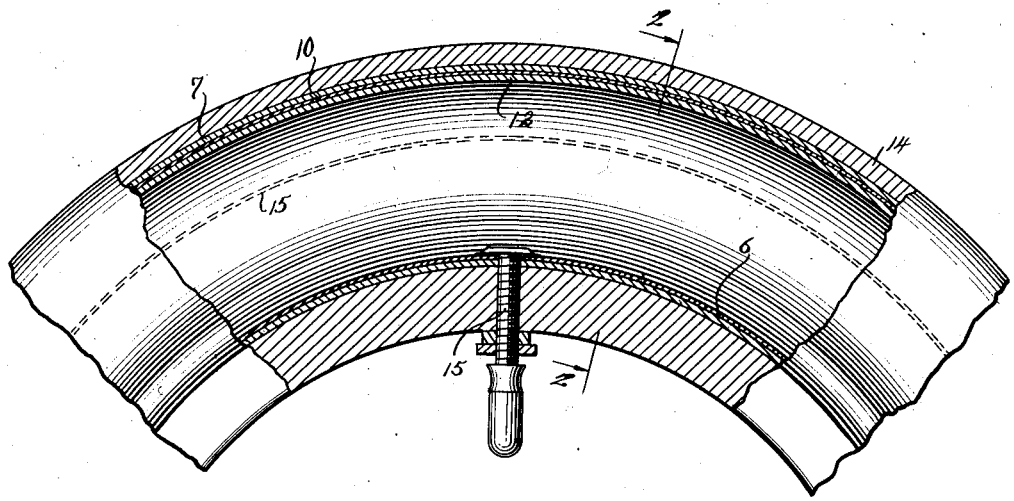
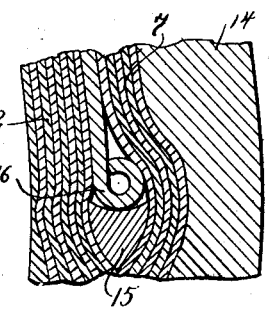
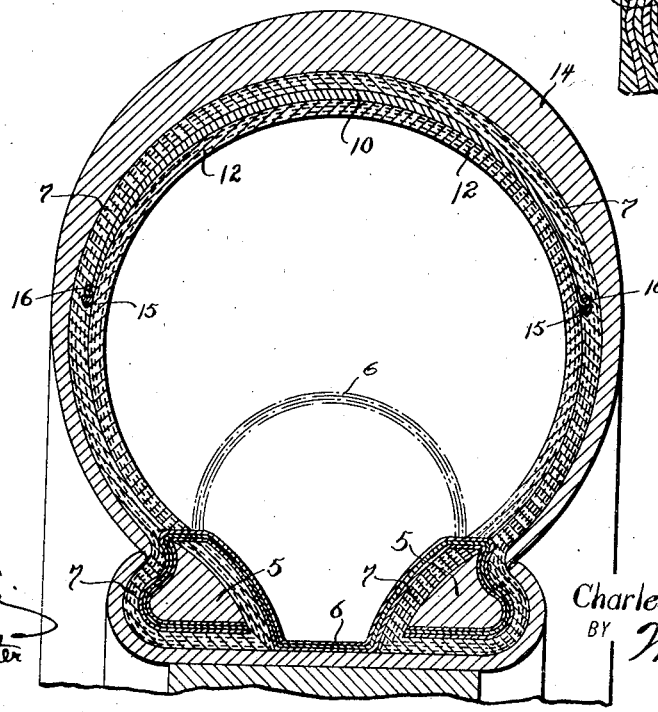
WITNESSES
INVENTOR
Charles W. Strauser,
BY
ATTORNEYS

UNITED STATES PATENT OFFICE.

CHARLES W. STRAUSER, OF NEW YORK, N. Y.

TIRE.

1,355,788.  Specification of Letters Patent.  Patented Oct. 12, 1920.

Application filed October 20, 1919. Serial No. 331,983.

*To all whom it may concern:*

Be it known that I, CHARLES W. STRAUSER, a citizen of the United States, and resident of New York city, borough of the Bronx, and county of Bronx, in the State of New York, have invented a new and Improved Tire, of which the following is a full, clear, and exact description.

This invention relates to vehicle tires, and more particularly to pneumatic tires. Present invention specifically appertains to a pneumatic tire of what may be known as the single tube type, or pertains to a tubeless pneumatic tire.

An object of the invention is to provide a vehicle tire of the single tube type so constructed as to form a closed air chamber without the necessity of employing an inner tube. It is a purpose to provide a single tube pneumatic tire, or tubeless pneumatic tire, which will eliminate the usual trouble and expense of repairing the rubber inner tubes so prevalent in pneumatic tires of present day use.

I also have in view to provide a puncture proof tire, that is to say a tire so constructed as to resist penetration by nails and other objects which tend to puncture and destroy tires.

With the above principal objects and others in view, this invention relates to the tubeless pneumatic tire, several embodiments of which are disclosed in the appended claims, and relates to the practical example of a tire described in this specification, and illustrated in the accompanying drawings, wherein:

Figure 1 shows a fragmentary part of a tire mounted on a vehicle rim, and a portion of the said fragmentary part being shown in longitudinal sectional view.

Fig. 2 illustrates a cross sectional view taken on the line 2—2 of Fig. 1.

Fig. 3 is an enlarged detail view of a supporting ring used in connection with a puncture proof armor shield to prevent wear of the tire wall due to movement of the armor shield.

A tire casing is employed and is quite similar in structure to the tire of present day use. A strip of rubber or rubberized fabric is joined to the inner periphery or edge of the casing, that is to say the edges of a long strip of flexible material are embedded in the bead of the casing to close and seal said casing, and functions to form the tire into a single tube, or a tubeless tire.

In constructing a tire in accordance with the principles of this invention, there is employed an outer rubber tread which may be made either smooth or corrugated to suit the conditions of the user as is the case with tires of present day manufacturers. A lining or fabric is joined to the inner side of the tread and vulcanized therewith to effect a unitary structure. The usual tire beads are employed, and a flexible inner closure tongue of rubber has each edge wrapped around one of the tire beads and vulcanized together to form a composite structure. The vulcanized beads and flexible tongue are wrapped within the folds of the inner edge or rim of the fabric, and the joined parts are thoroughly vulcanized to form a solid one piece structure. The central portion of the tongue is left free to collapse within the tire when the tire is removed from the rim. A puncture proof shield, or armor ring is then applied to the fabric nearest to the tire tread. Finally another piece of fabric or lining is applied to the inner walls of the structure to cover up the armor and complete the tire.

A summary of the tire structure has been given, and a detailed description will now follow referring to the drawings.

In accompanying drawings the reference numeral 5 points out the bead core of the tire. The beads are usually constructed in the shape of a ring and have an outer oval face in order to present a contour symmetrical with the contour of the adjacent clencher ring of a tire rim.

An inner flexible rubber tongue 6 is wrapper around the bead core. The flexible tongue will preferably be applied to the outer face of the bead and passed about half way around until the inner edge of each bead core is flush with the edge of the flexible strip or tongue. This construction disposes the flexible tongue between the beads, and the central medial line of the tongue lies about midway between said beads. A tire fabric piece 7 has each inner edge or rim applied against the tongue covering of each bead core and is wrapped around the tongue covered portion of the bead and applied to the inner face of each bead core.

A tire armor or puncture proof ring or shield 10 is joined to the inner periphery of the tire fabric piece. A tire lining 12 is applied to the inner wall of the structure to cover the puncture proof shield and to finish the interior structure of the tire. The armor shield 10 will effectually prevent penetration of the tire. The tire gains adequate resiliency in its side walls. The outer edge of the armor shield will preferably be rolled or turned to present an oval or rounded surface to the adjacent fabric to prevent wear and cutting of the fabric at that point. To insure against wear of the tire walls at the juncture of the edge of the shield 10 and tire walls 7 and 12, there may be employed a seat ring 15 made of rubber or other suitable material vulcanized in the tire wall to support the rolled edge 16 of the shield. This ring 15 provides an adequate base against which the rolled edge 16 may work and move during the running of the tire.

A rubber tread or tire face 14 is applied to the outer perimeter of the entire structure and vulcanized thereto.

In applying this tire to the vehicle rim, the inner flexible rubber tongue will collapse upwardly into the tire as shown in dotted lines in Fig. 2. This will permit the beads of the tire to be pushed together in order to place the tire on the rim. As the tire is inflated under pressure with air pumped in, tongue 6 will gradually move down against the rim of the tire and take up the position shown in full lines in Fig. 2. The inner flexible rubber tongue 6 acts as a seal for the tire and functions, so to speak, similarly to the inner tube of the pneumatic tire.

The Fig. 2 shows the flexible tongue constructed of a plurality of layers of material, while the Fig. 1 is a detailed and similar view showing the tongue made of one piece of material.

The usual type of valve tube 15 may be employed. It connects with the flexible tongue similarly to the manner of joining the present day inner tube to the valve stem.

This invention and resulting tire is presented to fulfil the need felt for a puncture proof tire, and a tire which is free from inner tube troubles so prevalent in present day use.

Having thus described my invention; what I claim as new and desire to secure by Letters Patent is:

1. In pneumatic tire construction comprising, a pair of tire beads each made in the form of a ring, a long and relatively wide strip of flexible material having its opposite edges permanently incorporated into a bead, and a tire casing built onto the beads whereby the said strip forms an inner flexible tongue to entirely fill the space between the beads to complete an air tight single tube tire construction.

2. In vehicle tire construction comprising, a casing of the clencher type having a tire bead formed along each edge of the tire to fit a vehicle rim, characterized by having a relatively wide tongue joined at its opposite edges to the beads to form an air tight tire structure, said tongue adapted to lie in contact with the opposing faces of the beads and the rim when the tire is inflated.

3. In pneumatic tire construction, a tire casing, a flexible tongue with edges permanently joined with the tire, and a bead core applied to the tongue edges in such a way that the tongue will flex up and down to permit the assembling of the tire on the vehicle rim, the said tongue edges being fixed between the bead core and the fabric portion of the casing.

CHARLES W. STRAUSER.